(12) United States Patent
Van Boxtel

(10) Patent No.: US 10,682,944 B2
(45) Date of Patent: Jun. 16, 2020

(54) COUPLER FOR COUPLING A SUBSTANTIALLY ELONGATED BELT PORTION, COUPLER ASSEMBLY AND COUPLING METHOD

(71) Applicant: Slim Gevonden B.V., Benschop (NL)

(72) Inventor: Leonardus Johannes Josephus Van Boxtel, Riel (NL)

(73) Assignee: Slim Gevonden B.V., Benschop (NL)

( * ) Notice: Subject to any disclaimer, the term of this patent is extended or adjusted under 35 U.S.C. 154(b) by 310 days.

(21) Appl. No.: 15/521,392

(22) PCT Filed: Oct. 22, 2015

(86) PCT No.: PCT/NL2015/050731
§ 371 (c)(1),
(2) Date: Apr. 24, 2017

(87) PCT Pub. No.: WO2016/064272
PCT Pub. Date: Apr. 28, 2016

(65) Prior Publication Data
US 2017/0320425 A1 Nov. 9, 2017

(30) Foreign Application Priority Data

Oct. 23, 2014 (NL) ...................................... 2013670

(51) Int. Cl.
*B60P 7/08* (2006.01)
*B60P 3/079* (2006.01)
(Continued)

(52) U.S. Cl.
CPC ............... *B60P 7/083* (2013.01); *B60P 3/079* (2013.01); *B60P 7/0823* (2013.01); *F16B 45/025* (2013.01); *A44B 11/125* (2013.01)

(58) Field of Classification Search
CPC ....... B60P 7/083; B60P 7/0823; A44B 11/125
See application file for complete search history.

(56) References Cited

U.S. PATENT DOCUMENTS 5,271,127 A * 12/1993 Christensen
6,273,353 B1 * 8/2001 Berger ................. A44B 11/125
24/68 CD
(Continued)

FOREIGN PATENT DOCUMENTS

DE 102009023937 A1 12/2010
GB 163581 5/1921
WO 2014154947 A1 10/2014

*Primary Examiner* — Victor D Batson
*Assistant Examiner* — Matthew J Sullivan
(74) *Attorney, Agent, or Firm* — The Webb Law Firm

(57) ABSTRACT

The invention relates to a coupler for coupling a substantially elongated belt portion, comprising a housing, comprising a first beam, extending substantially perpendicular to the longitudinal direction of the belt portions, for guiding a belt portion, a connector, located on a distance from the first beam, at least two sidewalls, which extend between the first beam and the connector, which sidewalls are located on opposite ends of the first beam, wherein at least a part of at least one side wall is pivotable between at least two positions: a closed position wherein the pivotable sidewall portion engages the first beam to limit a belt passage between the side walls, the connector and the first beam, and an opened position wherein the pivotable sidewall portion is located on a distance of the first beam to allow passage of a belt portion between the pivotable sidewall portion and the first beam.

13 Claims, 3 Drawing Sheets

(51) Int. Cl.
*F16B 45/02* (2006.01)
*A44B 11/12* (2006.01)

(56) References Cited

U.S. PATENT DOCUMENTS

| | | | |
|---|---|---|---|
| 6,279,847 B1* | 8/2001 | Berger | A44B 11/125 |
| | | | 24/68 CD |
| 6,606,769 B1 | 8/2003 | Harris | |
| 6,877,189 B2* | 4/2005 | Simonson | B60P 7/083 |
| | | | 24/163 R |
| D628,873 S* | 12/2010 | Kelleghan | D8/356 |
| D670,154 S* | 11/2012 | Kelleghan | |
| 8,875,355 B2* | 11/2014 | Sartin | |
| D737,644 S* | 9/2015 | Fischer | |
| 9,139,126 B2* | 9/2015 | Dickey | B60P 7/08 |
| D740,105 S* | 10/2015 | Kelleghan | D8/356 |
| D746,662 S* | 1/2016 | Kelleghan | D8/356 |
| 9,266,462 B2* | 2/2016 | Miller | B60P 7/0823 |
| 9,469,238 B1* | 10/2016 | Coleman | |
| 10,221,918 B2* | 3/2019 | Simonson et al. | |
| 2005/0229367 A1 | 10/2005 | Thompson | |
| 2010/0137112 A1* | 6/2010 | Harker | A63B 21/0552 |
| | | | 482/92 |
| 2010/0218348 A1 | 9/2010 | Mamie | |
| 2011/0209314 A1* | 9/2011 | Miller | B60P 3/079 |
| | | | 24/68 CD |
| 2011/0209315 A1* | 9/2011 | Miller | B60P 7/083 |
| | | | 24/68 CD |
| 2013/0326848 A1* | 12/2013 | Strahl | B60P 7/0823 |
| | | | 24/69 ST |
| 2017/0182928 A1* | 6/2017 | Seader | B60P 7/0823 |

* cited by examiner

COUPLER FOR COUPLING A SUBSTANTIALLY ELONGATED BELT PORTION, COUPLER ASSEMBLY AND COUPLING METHOD

CROSS-REFERENCE TO RELATED APPLICATIONS

This application is the United States national phase of International Application No. PCT/NL2015/050731 filed Oct. 22, 2015, and claims priority to Netherlands Patent Application No. 2013670 filed Oct. 23, 2014, the disclosures of which are hereby incorporated in their entirety by reference.

BACKGROUND OF THE INVENTION

Field of the Invention

The present invention relates to a coupler for coupling a substantially elongated belt portion and an assembly of a coupler and at least one belt portions. The invention also relates to a method for coupling belt portions by means of such a coupler.

Description of Related Art

The use of a coupler for coupling for instance cargo straps is well known and well used in the art. For instance cargo straps are typically provided with a coupler, which is located on one end of the cargo strap. For using such a prior art coupler a strap with on one side a coupler connected to is placed around a load that requires securing, subsequently a free end of the strap that is placed around the load is fed through an opening in the coupler until the strap is tightly wound around the load. The strap may also be placed around the load including further items like for instance a carrier, a mounting, another load, to secure the load.

A disadvantage of such couplers is that, for instance when the size of the load to be secured is small, a large amount of free strap length has to be fed through the opening of the coupler until the portion of the strap that is actually used to secure the load is tightened enough to secure the load. The transfer of the over-length of free trap end through the coupler is time-consuming.

SUMMARY OF THE INVENTION

It is therefore an object of the current invention to overcome these drawbacks of the prior art, and to provide a coupler which may be efficiently used to couple belt portions. The present invention thereto proposes a coupler for coupling a substantially elongated belt portion, comprising a housing, comprising a first beam, extending substantially perpendicular to the longitudinal direction of the belt portions, for guiding a belt portion, a connector, located on a distance from the first beam, at least two sidewalls, which extend between the first beam and the connector, which sidewalls are located on opposite end faces of the first beam, wherein at least a part of at least one side wall is pivotable between at least two positions: a closed position wherein the pivotable sidewall portion engages the first beam to limit a belt passage between the side walls, the connector and the first beam, and an opened position wherein the pivotable sidewall portion is located on a distance of the first beam to allow passage of a belt portion between the pivotable sidewall portion and the first beam at distance.

The pivotable portion of the sidewall allows the coupler to be opened sideways, which provides the opportunity to insert a belt portion from the side (laterally) into the coupler, thus avoiding the need to feed a large length of the belt to be fed through the passage until the situation is realised that a belt is tightened around a load. After opening the coupler sideways and insertion of the belt portion, the pivotable portion of the sidewall may be closed, to keep the belt portion inside the coupler during use. This prevents the belt portion to exit the coupler sideways (laterally) undesired. The belt is now already (or almost nearly) in the position wherein the coupler may be activated for the actual fastening of the load. The ability to feed the belt sideways (laterally) into the coupler thus facilitates an easier use of a coupler that requires less effort to place the belt portion to be coupled in the desired coupling position. This not only saves time but also minimises wear of the belt.

The connector may be formed by a hook, to connect the coupler to for instance a truck or a loader. The connector may also be formed by a second beam, which second beam extends substantially parallel to the first beam. This second beam can for instance be used to connect the coupler to a belt portion, wherein the belt portion is looped around the second beam, and stitched into place, such that the coupler can be used for coupling two substantially elongated belt portions. These two belt portions may even be two opposite ends of a single elongated belt.

The coupler may also be provided with a clamping element, for clamping a belt portion between the clamping element and the first beam and/or the connector, which clamping element is movable between at least two positions: a first position wherein the clamping element is in a clamping position close to the first beam and/or connector; and a second position wherein the clamping element is in a non-clamping position on the distance of the first beam and/or connector. The clamping element allows to secure an inserted belt portion in the coupler such that the belt portion is in a fixed (secured) position wherein a load is secured (held in a desired position) by a belt. The clamping element may be designed such that the pivotable sidewall portion is only allowed to move (pivot) when the clamping element is in the second—non-clamping—position. With such additional functionality there is an additional safeguard against undesired loosening of a coupled belt end. As long as the pivotable sidewall portion is in the closed position there is not possibility to release the engaged belt end from the coupling (also not on the traditional longitudinal movement of the belt end).

The pivotable sidewall portion can be provided with a locking element, which locking element, in the opened position of the pivotable sidewall portion, secures the clamping element in the non-clamping position. In the closed position of the pivotable sidewall portion the belt passage is limited by the first beam, the connector and sidewalls and thus there is a prevention for a belt portion to leave the belt passage sideways (laterally). The only option for a belt portion to leave the belt passage is by longitudinal movement of the belt portion. The locking element allows opening of the sidewall only when there are no clamping forces on the belt, such that the belt may then be safely removed from the belt passage.

The pivotable sidewall portion may be provided with an aperture, for receiving at least a part of an end face of the first beam. Such an aperture may receive the end face of the first beam when the pivotable portion is in the closed position. This provides structural integrity to the coupler in its closed state (the closed position of the pivotable sidewall portion), when forces are applied to the coupler.

The pivotable sidewall portion may be pivotable around an axis, which axis lies outside the belt passage. Placing the axis outside the belt passage prevents the belt portion in the belt passage to be hindered by the pivotable sidewall portion and/or its axis. In a robust embodiment of the coupler the axis may coincide with the pivotable sidewall or may be located on the side of the pivotable sidewall faces away from the belt passage. Such a coupler may also be compact, but additionally provides structural integrity to the coupler, especially when the pivotable sidewall portion is provided with an aperture, for receiving at least a part of an end face of beam, as this enables to align the aperture and the axis, and minimizes undesired forces in the pivotable sidewall portion and the axis. The resulting compactness of the coupler also reduces the chances of accidental opening of the pivotable sidewall portion, for instance when external forces are applied to the coupler.

The pivotable sidewall portion may be provided with a biasing element, which biasing element experts a pressure on the pivotable sidewall portion directed towards the belt passage. Such biasing element may keep the pivotable sidewall portion in the closed position, until a predetermined release force is applied to the pivotable sidewall portion. The biasing element, such as a spring, may keep the coupler in a closed position when idle, but also prevents unwanted opening of the coupler, and therefore possible undesired exit of a belt portion held by the coupler. When a predetermined force is been applied to the pivotable sidewall portion, the biasing force of the element may be overcome, such that the sidewall portion may pivots to the other—opened—state, to allow sideward insertion and sideward removal of a belt portion.

The end face of the first beam, that cooperates with the pivotable sidewall portion, may be chamfered to facilitate insertion of a belt portion in the belt passage. The presence of such chamfered end face of the beam facilitates lateral insertion of a belt portion in the passage when the pivotable sidewall portion is in the opened position. The chamfered end face of the beam facilitates the insertion of a belt portion in the coupler when the sidewall is in its opened state, as the chamfered portion of the beam will guide the belt portion in the correct direction.

The present invention also relates to an assembly of a coupler and at least one belt portion. The assembly may also comprise at least two belt portions or two end pieces of a single belt.

The invention further relates to a method for coupling a substantially elongated belt portion by means of a coupler, comprising the steps of a) connecting the coupler by means of a connector of the coupler, b) pivoting a pivotable sidewall portion of the coupler to provide access to a belt passage, c) inserting a belt portion in the belt passage of the coupler, d) pivoting the pivotable sidewall portion of the coupler to a closed position; and e) fastening the belt portion to a first beam of the coupler. The method may further also comprise a step f) securing the belt portion in the coupler with a clamping element. According this method the advantages as specified above in relation to the coupler according the present invention may be realised, which are here incorporated by reference in relation to the method according the present invention.

BRIEF DESCRIPTION OF THE DRAWINGS

The invention will be further elucidated herein below on the basis of the non-limitative exemplary embodiments shown in the following figures. Herein.

DESCRIPTION OF THE INVENTION

Figure 1:
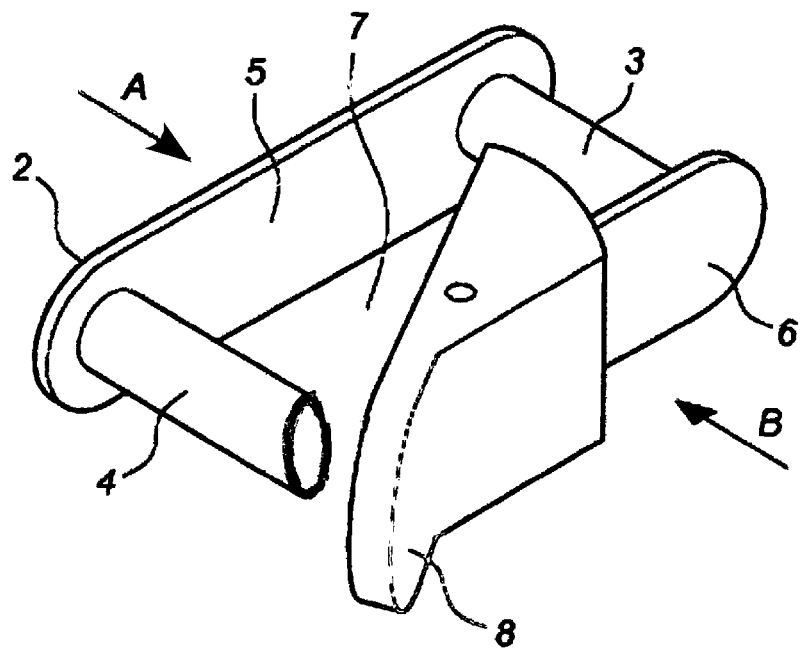
FIG. 1 schematically shows a coupler according to the present invention in opened state.

FIG. 1 schematically shows a coupler (1) in opened state with a housing (2); a connector (3); and a first beam (4), which first beam (4) is located on a distance from the connector (3). The connector (3) is formed by a second beam (3), which extends substantially parallel to the first beam (4). The housing (2) further comprises two sidewalls (5, 6), which extend between the first (4) and second beam (3), which sidewalls (5, 6) engage opposite end faces (A, B) of the beams (3, 4). In the depicted situation the sidewalls (5, 6) and beams (3, 4) do not completely surround a belt passage (7). A portion (8) of the sidewall (6) is pivotable between at least two positions, wherein the shown position in FIG. 1 is the opened position. The opened pivotable sidewall portion (8) allows lateral insertion of a belt portion (not depicted in this figure) in the belt passage (7).

Figure 2:
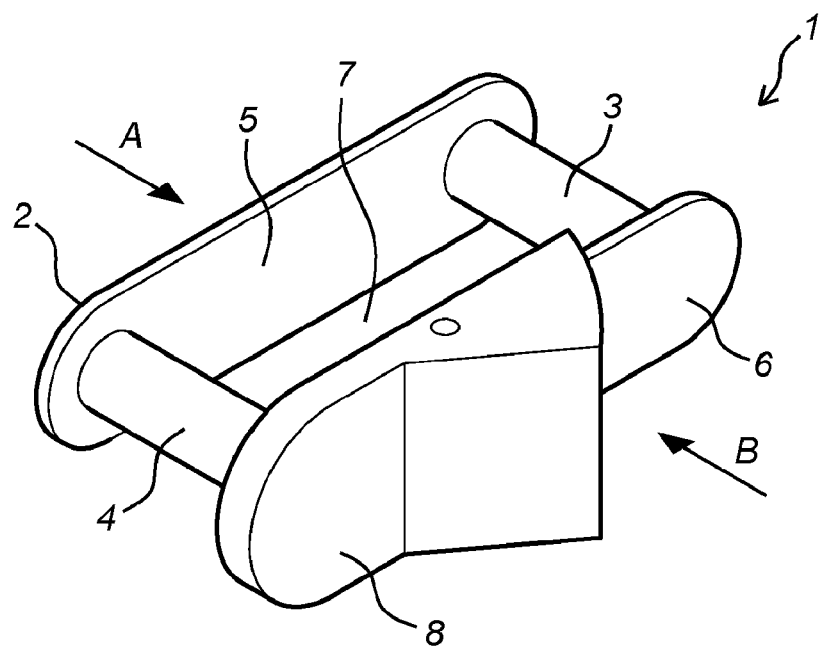
FIG. 2 schematically shows a coupler according to the present invention in closed state.

FIG. 2 schematically shows the coupler (1) as shown in FIG. 1. In the depicted situation in this figure the sidewalls (5, 6) and beams (3, 4) completely surround a belt passage (7). A portion (8) of sidewall (6) is pivotable between at least two positions, wherein the shown position in FIG. 2 is the closed position. The closed pivotable sidewall portion (8) encloses prevents a belt portion (not depicted here) inserted in the belt passage (7) to come sideways (lateral) out of the belt passage (7).

Figure 3:
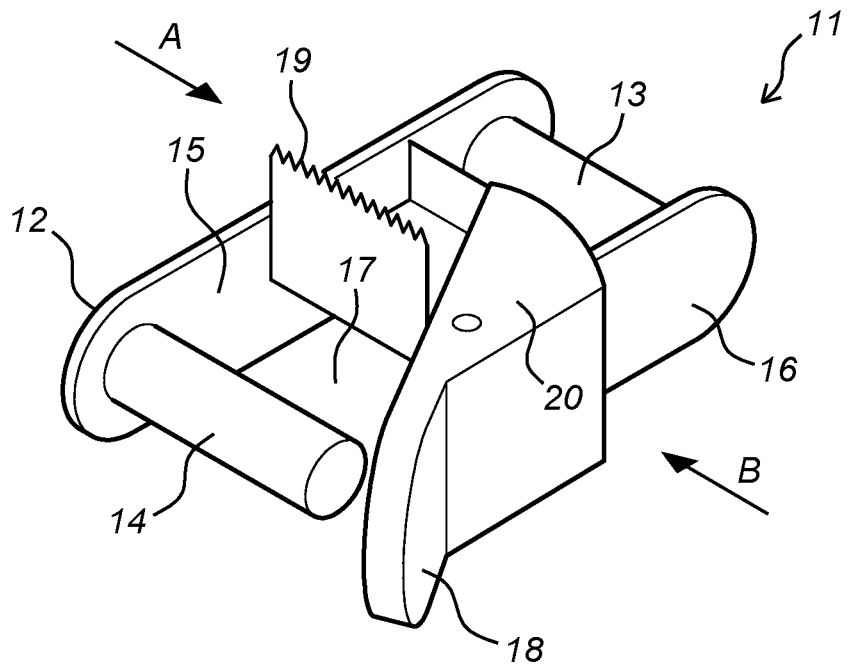
FIG. 3 schematically shows a coupler provided with clamping element according to the present invention in opened state.

FIG. 3 schematically shows a coupler (11) in an opened state with a housing (12); a first beam (14); a second beam (13), which second beam (13) is located on a distance from the first beam (14) and which second beam (13) extends substantially parallel to the first beam (13). The housing (12) further comprises two sidewalls (15, 16), which extend between the first (13) and second beam (14), which sidewalls (15, 16) engage opposite end faces (A, B) of the beams (13, 14). The sidewalls (15, 16) and beams (13, 14) do not completely surround a belt passage (17) as a pivotable sidewall portion (18) of sidewall (16) is in an opened position; thus allowing lateral insertion (or removal) of a (not depicted) belt portion in (from) the belt passage (17).

The coupler (11) in FIG. 3 further comprises a clamping element (19) that is at least partially located in the belt passage (17). The clamping element (19) is movable between two positions of which positions here in FIG. 3 the second non-clamping position is shown. The clamping element (19) will in the depicted position not engage on a (not depicted) belt portion in the passage (17) that will be wrapped around the first beam (14). FIG. 3 further shows an optional locking element (20), provided on the pivotable sidewall portion (18), which locking element (20), in the opened position of the pivotable sidewall portion (18) as shown in FIG. 3, keeps the clamping element (19) in the second open position.

Figure 4:
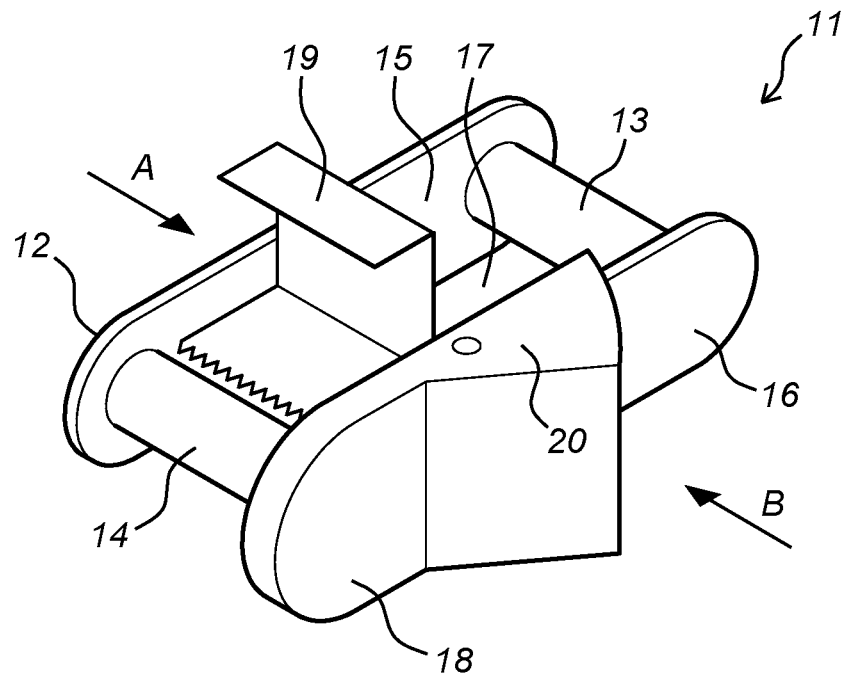
FIG. 4 schematically shows a coupler provided with clamping element according to the present invention in closed state.

FIG. 4 schematically shows the coupler (11) of FIG. 3, wherein the clamping element (19) is in a first clamping position. In this clamping position the clamping element (19) may engage on a belt portion in the passage (17), that may be wrapped around the first beam (14). The clamping element (19) now blocks the belt passage (17). FIG. 4 further shows that optional locking element (20), as part of the pivotable sidewall portion (18), in the closed position of the pivotable sidewall portion (18) allows clamping of a belt portion (not shown here) by the clamping element (19).

Figure 5:
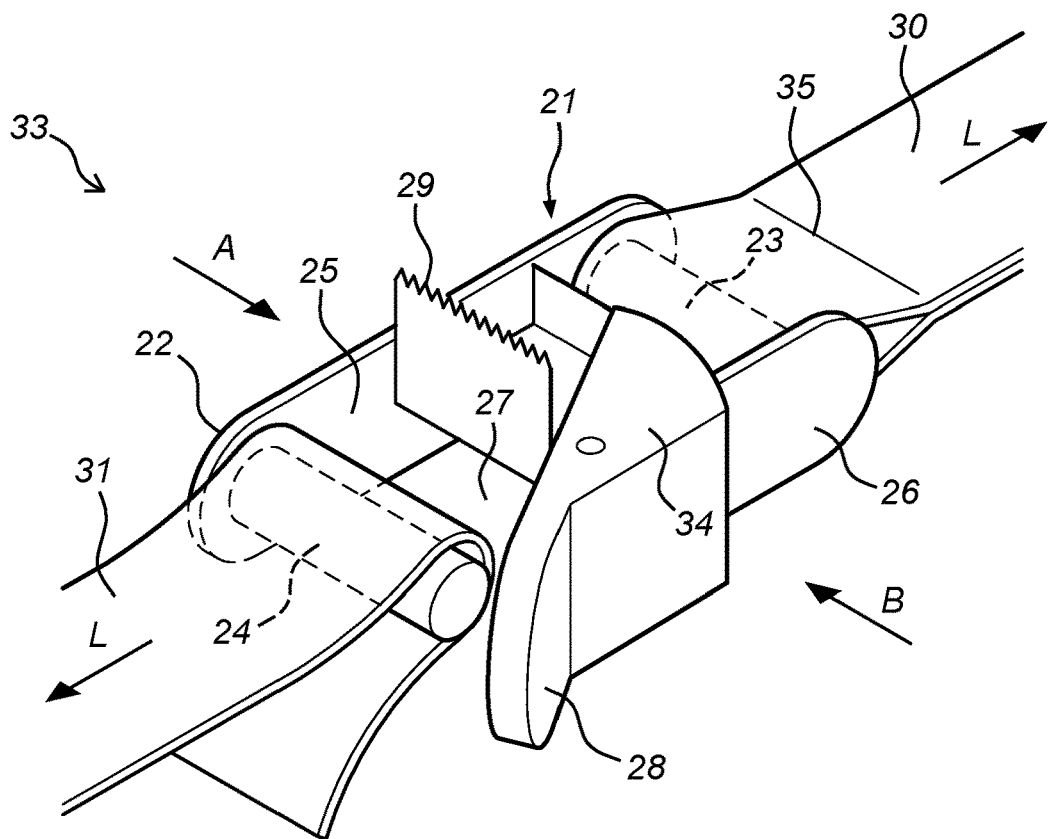
FIG. 5 schematically shows an assembly of a coupler and a belt according to the present invention in opened state.

FIG. 5 schematically shows an assembly (33) of two belt portions (30, 31) and a coupler (21) as shown in FIGS. 3 and 4 for coupling the two substantially elongated belt portions (30, 31). The coupler (21) connects the two belt portions (30, 31) in the longitudinal direction (L) as indicated in this figure. The first belt portion (30) is turned around the second beam (23) and the second belt portion (31) is turned around the first beam (24). FIG. 5 shows the coupler (21) in the opened position, so between the first beam (24) and the pivotable part (28) of the sidewall (26) is a free passage (27). This free passage (27) allows lateral insertion or removal of the second belt portion (31) through the passage (27). The first belt portion (30) is fixed connected to the second beam (23) as the first belt portion (30) is turned around the second beam and the first belt portion (30) is sewed together with a seam (35). In the shown position the second belt portion 31 is easy moveable sideward (laterally) to remove and/or to replace through the passage (27). Not only the presence of the passage (27) enables such, also the retracted position of a clamping element (29) enables the freedom of sideward movement of the second belt portion (31). As the pivotable part (28) of the sidewall (26) is in the open position the pivotable part (28) of the sidewall (26) prevents the clamping element (29) to be moved towards a clamping position.

Figure 6:
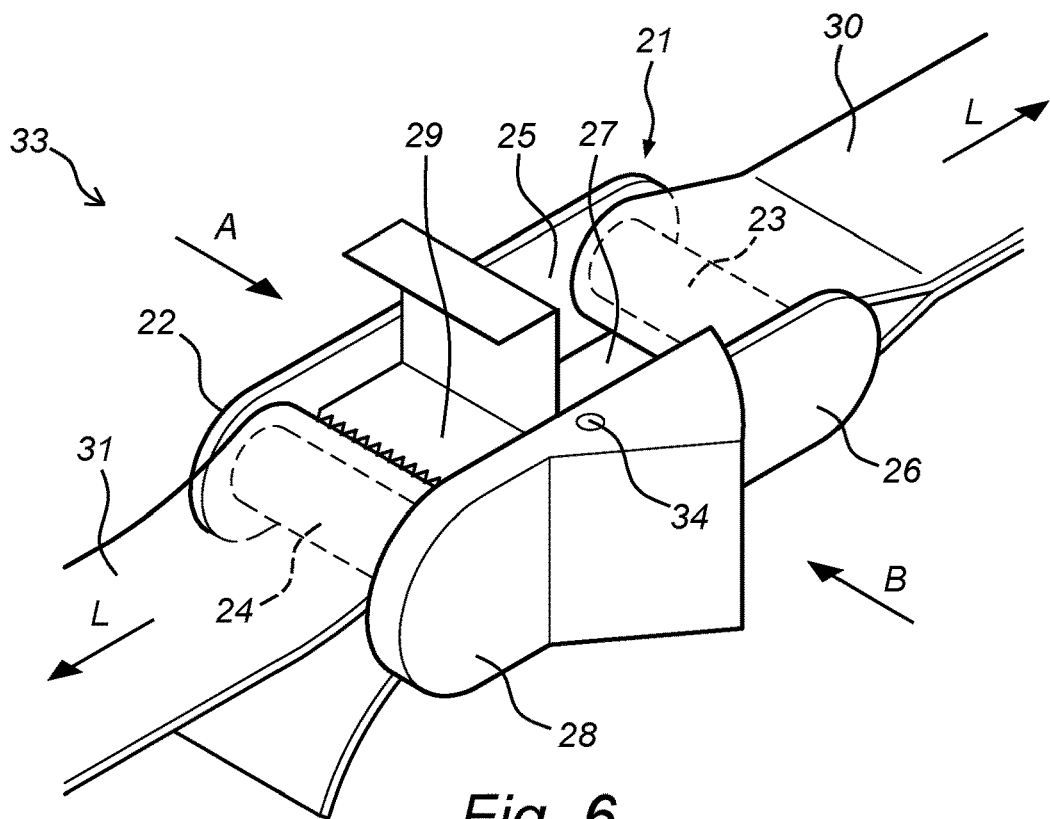
FIG. 6 schematically shows an assembly of a coupler and a belt according to the present invention in closed state.

In FIG. 6 the assembly (33) of two belt portions (30, 31) and the coupler (21) as shown in FIG. 5 is now in the closed position, as the pivotable sidewall portion (28) is pivoted around axis (34) to close the passage (27) as shown in FIG. 5. The axis (34) is more or less in line with the sidewall (26). Also different compared to FIG. 5 is that the clamping element (29) here is in clamping position, this contacting the second belt portion (31).

Inventive concepts are illustrated in a series of examples, some examples showing more than one inventive concept. Individual inventive concepts may be implemented without implementing all details provided in a particular example. It is not necessary to provide examples of every possible combination of the inventive concepts provide below as one of skill in the art will recognize that inventive concepts illustrated in various examples may be combined together in order to address a specific application.

Other coupler constructions, assemblies, methods and advantages of the disclosed teachings will be or will become apparent to one with skill in the art upon examination of the figures and detailed description. It is intended that all such additional constructions, assemblies, methods, features and advantages be included within the scope of and be protected by the accompanying claims.

The invention claimed is:

1. A coupler for coupling a substantially elongated belt portion, comprising:
 a housing, comprising:
  i) a first beam, extending substantially perpendicular to the longitudinal direction of the belt portion, for guiding a belt portion;
  ii) a connector, located on a distance from the first beam,
  iii) at least two sidewalls, which extend between the first beam and the connector, which sidewalls are located on opposite end faces of the first beam;
 wherein at least a part of at least one side wall is pivotable between at least two positions:
 a closed position wherein the pivotable sidewall portion engages the first beam to limit a belt passage between the sidewalls, the connector and the first beam, and
 an opened position wherein the pivotable sidewall portion is located on a distance of the first beam to allow passage of a belt portion between the pivotable sidewall portion and the first beam at distance,
 wherein the coupler also comprises a clamping element, for clamping a belt portion alternately between the clamping element and the first beam or the connector, which clamping element is movable between at least two positions:
 a first position wherein the clamping element is in a clamping position closer to the first beam or connector; and
 a second position wherein the clamping element is in a non-clamping position further from the first beam or connector wherein, in the closed position, the end faces of the first beam are substantially perpendicular to the at least two sidewalls, and at least one end face contacts the pivotable sidewall portion.

2. The coupler according to claim 1, wherein the pivotable sidewall portion is provided with a locking element, which locking element, in the opened position of the pivotable sidewall portion, secures the clamping element in the non-clamping position.

3. The coupler according to claim 2, wherein the locking element of the pivotable sidewall portion allows pivoting only when the clamping element is in the second non-clamping position.

4. The coupler according to claim 1, wherein the pivotable sidewall portion is provided with an aperture, for receiving at least a part of an end face of the first beam.

5. The coupler according to claim 1, wherein the pivotable sidewall portion is pivotable around an axis, which axis lies outside the belt passage.

6. The coupler according to claim 5, wherein the axis coincides with the pivotable sidewall portion.

7. The coupler according to claim 5, wherein the axis is located on the side of the pivotable sidewall portion faced away from the belt passage.

8. The coupler according to claim 1, wherein the pivotable sidewall portion is provided with a biasing element, which biasing element experts a pressure on the pivotable sidewall portion directed towards the belt passage.

9. The coupler according to claim 1, wherein the end face of the first beam is chamfered to facilitate insertion of a belt portion in the belt passage.

10. The coupler according to claim 1, wherein the connector comprises a second beam, which second beam extends substantially parallel to the first beam.

11. Assembly of a coupler according to claim 1 and at least one belt portion.

12. Assembly according to claim 11, wherein the coupler cooperates with two sides of the same belt.

13. A method for coupling a substantially elongated belt portion by means of a coupler, comprising the steps of:
 a. connecting the coupler by means of a connector of the coupler;
 b. pivoting a pivotable sidewall portion of the coupler to provide access to a belt passage;

c. inserting a belt portion in the belt passage of the coupler;
d. pivoting the pivotable sidewall portion of the coupler to a closed position; and
e. fastening the belt portion to a first beam of the coupler, wherein the method further comprises step f) securing the belt portion in the coupler with a clamping element, wherein, in the closed position, at least one face of the first beam of the coupler is substantially perpendicular to and contacts the pivotable sidewall portion.

* * * * *